(12) United States Patent
Kikuta

(10) Patent No.: US 9,706,071 B2
(45) Date of Patent: Jul. 11, 2017

(54) IMAGE READING DEVICE AND IMAGE FORMING APPARATUS INCLUDING IMAGE READING DEVICE

(71) Applicant: KYOCERA Document Solutions Inc., Osaka-shi, Osaka (JP)

(72) Inventor: Tomoyuki Kikuta, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 14/949,671

(22) Filed: Nov. 23, 2015

(65) Prior Publication Data

US 2016/0150101 A1 May 26, 2016

(30) Foreign Application Priority Data

Nov. 25, 2014 (JP) .................................. 2014-237793

(51) Int. Cl.
| | |
|---|---|
| *H04N 1/00* | (2006.01) |
| *H04N 1/10* | (2006.01) |
| *G06F 3/12* | (2006.01) |
| *G06K 15/02* | (2006.01) |

(52) U.S. Cl.
CPC ....... *H04N 1/0083* (2013.01); *H04N 1/00551* (2013.01); *H04N 1/10* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 4,849,793 A | * | 7/1989 | Someya | ............... G03G 15/605 174/351 |
| 7,616,353 B2 | * | 11/2009 | Yamanaka | ........... G03G 15/605 358/471 |
| 2005/0106917 A1 | * | 5/2005 | Chang | ................ H01R 13/7036 439/289 |
| 2006/0077478 A1 | * | 4/2006 | Kim | ................... H04N 1/00976 358/474 |

(Continued)

FOREIGN PATENT DOCUMENTS

| | | | | |
|---|---|---|---|---|
| JP | 56-064559 | * | 6/1981 | ............. H04N 1/028 |
| JP | 2014093736 A | | 5/2014 | |

*Primary Examiner* — Beniyam Menberu
(74) *Attorney, Agent, or Firm* — Alleman Hall Creasman & Tuttle LLP

(57) ABSTRACT

An image reading device includes: first and second conductive members provided so as to be opposed to each other at a predetermined position at pivot end side in cover portion in state where the cover portion is in first attitude, the first conductive member being provided in image reading portion and electrically conducted to first housing, the second conductive member being provided in the cover portion and electrically conducted to second housing; magnetic force generating portion and first magnetic force control portion configured to bias the second conductive member in a direction toward a predetermined reference position at which upper surface of the image reading portion and a cover surface are in contact with each other when the document cover is in the first attitude; and a holding portion configured to hold the second conductive member when the document cover is brought from the first attitude into a second attitude.

15 Claims, 11 Drawing Sheets

(56) References Cited

U.S. PATENT DOCUMENTS

| | | | | |
|---|---|---|---|---|
| 2006/0227305 | A1* | 10/2006 | Pee | G03G 15/605 |
| | | | | 355/18 |
| 2011/0205601 | A1* | 8/2011 | Akimoto | G03G 21/046 |
| | | | | 358/475 |
| 2011/0242623 | A1* | 10/2011 | Akimatsu | H04N 1/00546 |
| | | | | 358/498 |
| 2013/0321881 | A1* | 12/2013 | Ueda | H04N 1/00557 |
| | | | | 358/497 |
| 2014/0125007 | A1 | 5/2014 | Sakano et al. | |
| 2015/0331381 | A1* | 11/2015 | Kobayashi | H04N 1/00 |
| | | | | 358/1.13 |

\* cited by examiner

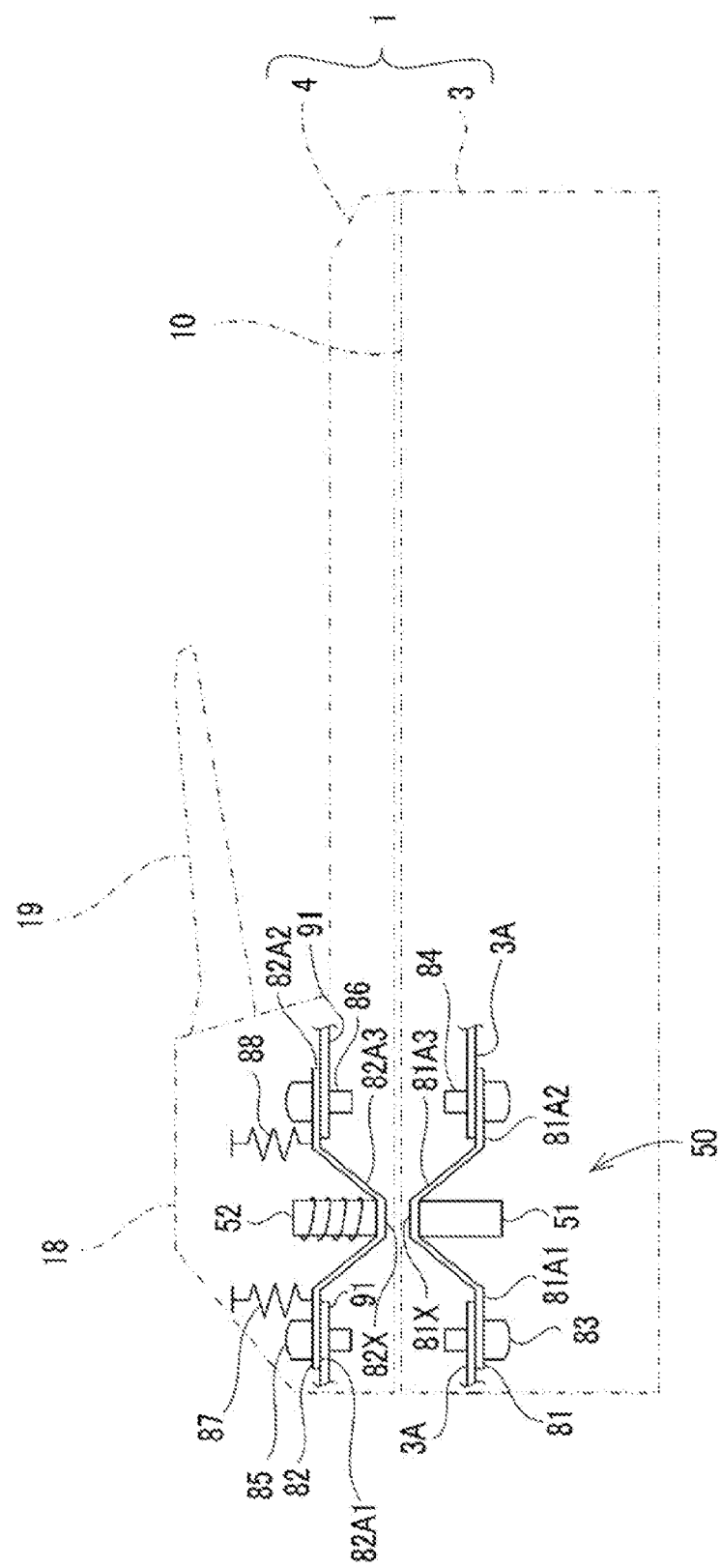

IMAGE READING DEVICE AND IMAGE FORMING APPARATUS INCLUDING IMAGE READING DEVICE

INCORPORATION BY REFERENCE

This application is based upon and claims the benefit of priority from the corresponding Japanese Patent Application No. 2014-237793 filed on Nov. 25, 2014, the entire contents of which are incorporated herein by reference.

BACKGROUND

The present disclosure relates to an image reading device including a cover portion for covering a document placement surface, and an image forming apparatus including the image reading device.

An image reading device including a cover portion above an image reading portion having a document placement surface, and an image forming apparatus including the image reading device, such as a multifunction peripheral, have been widely known. Normally, the cover portion is supported at a position on the back surface side of a main body of the apparatus so as to be pivotable between an open attitude in which the document placement surface is uncovered and a closed attitude in which the document placement surface is covered with the cover portion.

SUMMARY

An image reading device according to one aspect of the present disclosure includes an image reading portion, a cover portion, a conduction portion, a first conductive member and a second conductive member, a biasing portion, and a holding portion. The image reading portion includes a first housing having electrical conductivity and including, in an upper surface, a document placement surface on which a document sheet is placed, and is configured to read an image of the document sheet placed on the document placement surface. The cover portion includes a second housing supported by the first housing so as to be pivotable about an end portion of the upper surface of the first housing as a pivot center between a first attitude in which the second housing covers the upper surface and a second attitude in which the second housing is apart from the upper surface, and includes a cover surface contactable with the upper surface in the first attitude. The conduction portion is configured to electrically conduct the first housing and the second housing to each other at a predetermined position at the pivot center side in the cover portion. The first conductive member and the second conductive member are provided so as to be opposed to each other at a predetermined position at a pivot end side in the cover portion in a state where the cover portion is in the first attitude. The first conductive member is provided in the image reading portion and electrically conducted to the first housing. The second conductive member is provided in the cover portion and electrically conducted to the second housing. The biasing portion is configured to bias either one or both of the first conductive member and the second conductive member in a direction toward a predetermined reference position at which the upper surface and the cover surface are in contact with each other when the cover portion is in the first attitude. The holding portion is configured to hold either one or both of the first conductive member and the second conductive member when the cover portion is brought from the first attitude to the second attitude.

An image forming apparatus according to another aspect of the present disclosure includes the image reading device and an image forming portion configured to form the image read by the image reading device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a diagram showing the configurations of a first conductive member, a second conductive member, and a magnetic force generating portion.

DETAILED DESCRIPTION

First Embodiment

Figure 1:
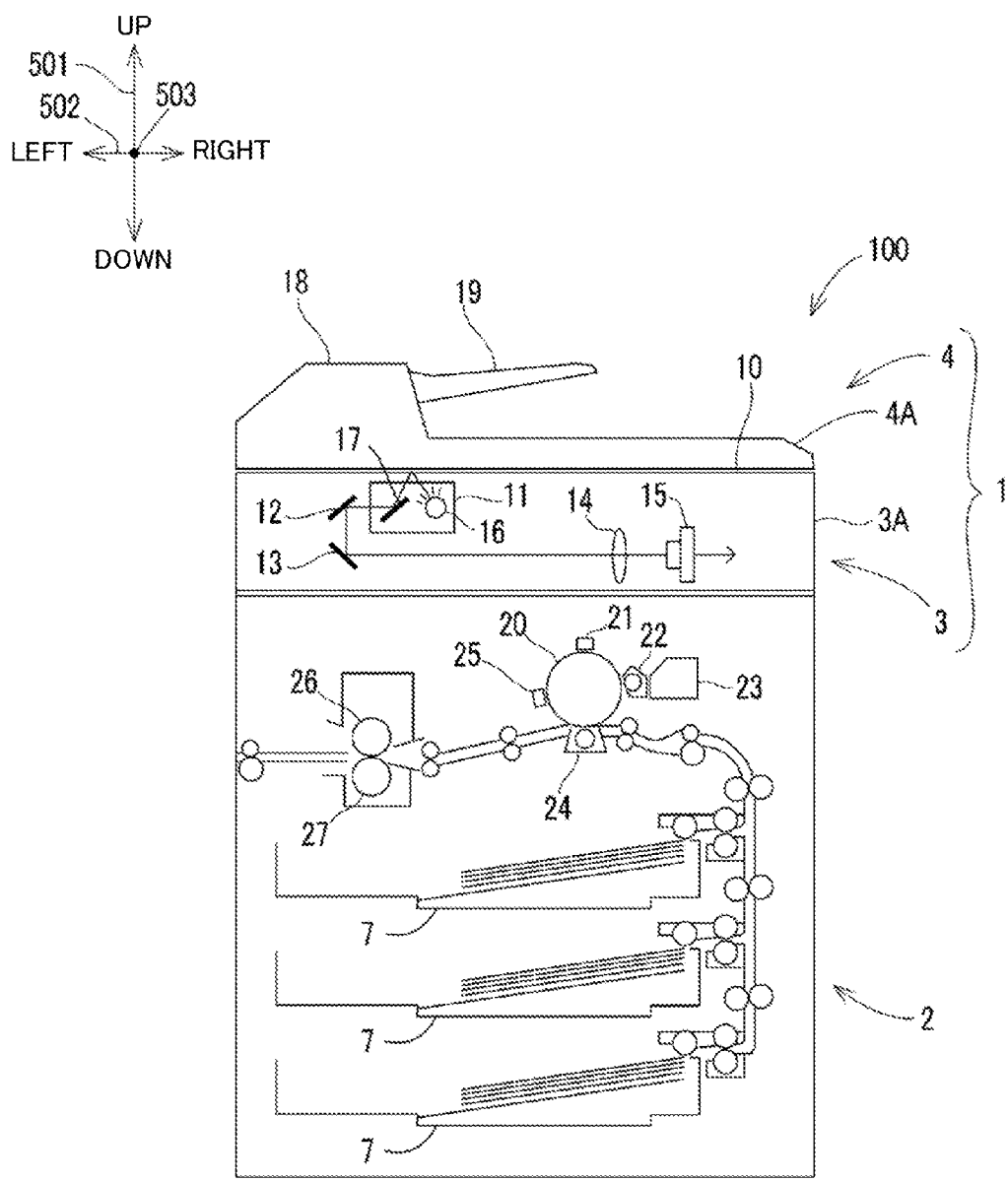
FIG. 1 is a configuration diagram showing the internal configuration of an image forming apparatus including an image reading device according to a first embodiment of the present disclosure.

An image forming apparatus 100 according to a first embodiment of the present disclosure will be described with reference to FIGS. 1 to 6. In the following description, an up-down direction 501 is defined on the basis of a state where the image forming apparatus 100 is installed on a flat plane. A right-left direction 502 is defined by the image forming apparatus 100 being viewed from the near side (front surface side). A direction orthogonal to the drawing plane of FIG. 1 is defined as a front-rear direction 503.

The image forming apparatus 100 is a multifunction peripheral having an image reading function, a facsimile function, and an image forming function, etc. The image forming apparatus 100 is not limited to the multifunction peripheral, and may be, for example, a facsimile apparatus, a copying machine, or the like.

The image forming apparatus 100 includes an image reading device 1 and an image forming portion 2. The image reading device 1 includes an image reading portion 3 and a document cover 4.

The image reading portion 3 executes a reading job of reading image data from a document sheet. The image reading portion 3 includes a housing 3A (see FIG. 3A). The housing 3A includes a housing frame (not shown). The housing frame is formed from a material having electrical conductivity, such as metal. The housing 3A is an example of a first housing of the present disclosure.

The image reading portion 3 is provided with a contact glass 10, a reading unit 11, mirrors 12 and 13, an optical lens 14, and an imaging element 15, etc. The image reading portion 3 also includes a drive circuit (not shown) which outputs a signal to the imaging element 15.

A glass surface of the contact glass 10 at the upper side is a document placement surface 10A2. An upper surface 3A1 of the image reading portion 3 is formed so as to include the document placement surface 10A2 (see FIG. 6). That is, the image reading portion 3 includes, in the upper surface 3A1, the document placement surface 10A2 on which a document sheet is to be placed.

The reading unit 11 is provided below the contact glass 10. The reading unit 11 includes an LED light source 16 and a mirror 17 and is configured to be movable in the right-left direction 502 by a movement mechanism (not shown) using a drive motor such as a stepping motor.

When light is emitted from the LED light source 16 and reflected on a document sheet placed on the document placement surface 10A2, the mirror 17 reflects the reflected light toward the mirror 12. The imaging element 15 is a photoelectric converter which receives the reflected light and outputs an electric signal (voltage) corresponding to the amount of the received light (intensity of brightness). The electric signal corresponding to the amount of the received light is digitized and transmitted as light amount data to a control portion 9.

The image reading portion 3 reads an image of a document sheet in the following procedure.

A user places a document sheet on the contact glass 10 and brings the document cover 4 into a later-described closed attitude (see FIG. 3A). Thereafter, the user performs an image reading start operation on an operation display portion 6.

When the image reading start operation has been performed, the image reading portion 3 executes the reading job. In the reading job, the drive motor moves, in the right-left direction 502, the reading unit 11 located at a predetermined home position. In parallel with the movement of the reading unit 11, the LED light source 16 continuously emits one line of light sequentially. Accordingly, scanning in the right-left direction 502 is performed with the light emitted from the LED light source 16 toward the contact glass 10 provided in the upper surface of the image reading portion 3.

Then, the reflected light from the document sheet is guided to the imaging element 15 via the mirrors 17, 12 and 13 and the optical lens 14, and the light amount data corresponding to the amount of the light received by the imaging element 15 is sequentially transmitted to an image processing portion (not shown). The image processing portion processes the light amount data to generate image information of the document sheet from the light amount data. In this manner, the image reading portion 3 reads the image of the document sheet placed on the document placement surface 10A2.

The document cover 4 is provided above the image reading portion 3. The document cover 4 includes a housing 4A (see FIG. 3A). The housing 4A includes a housing frame (not shown). The housing frame is formed from a material having electrical conductivity, such as metal. The housing 4A is an example of a second housing of the present disclosure.

Figure 3A:
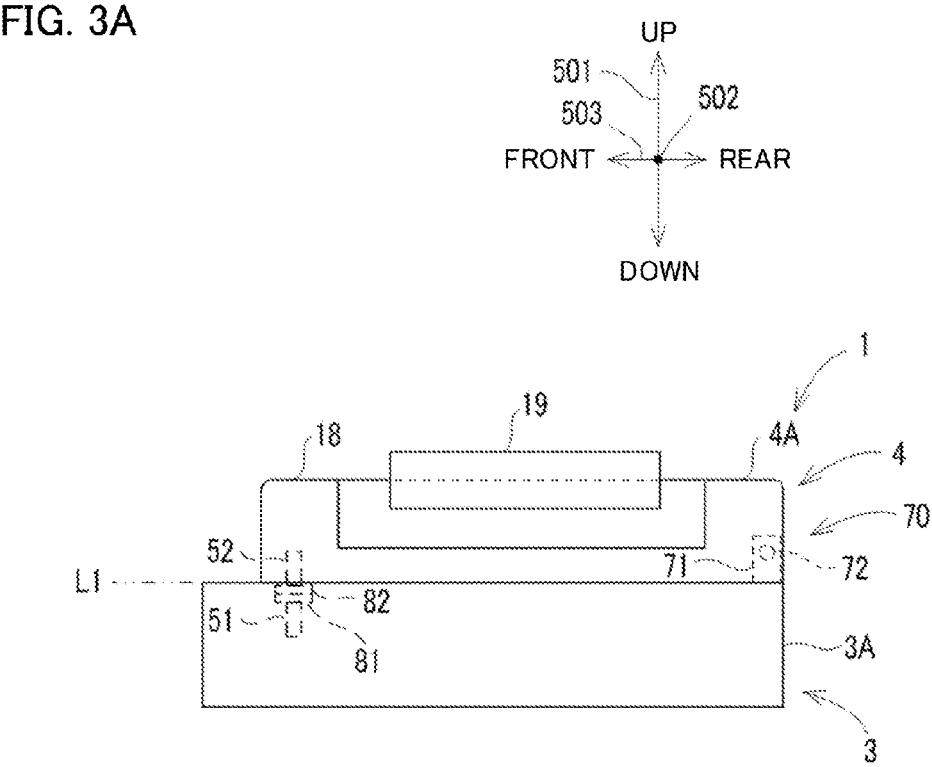
FIG. 3A is a diagram showing a closed attitude of a document cover.
Figure 3B:
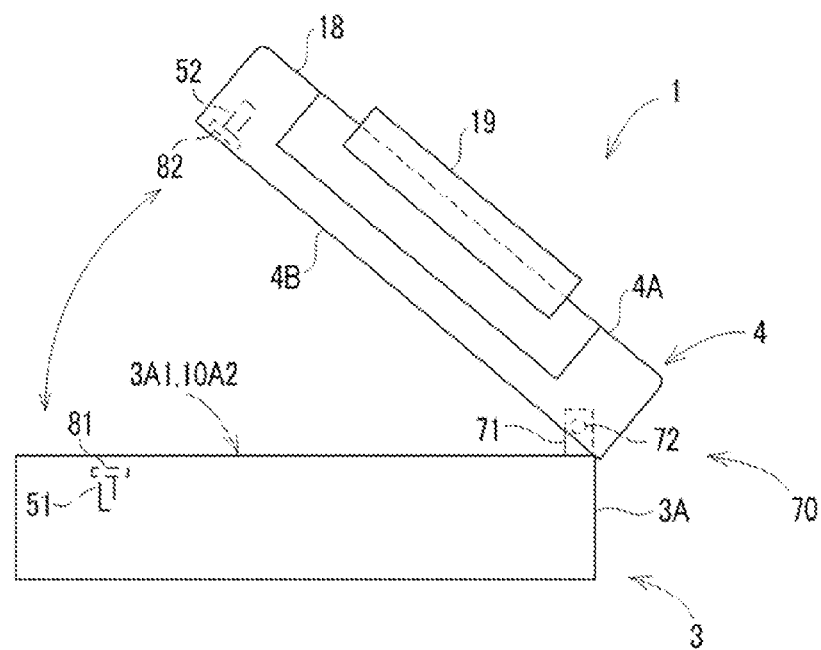
FIG. 3B is a diagram showing an open attitude of the document cover.

As shown in FIGS. 3A and 3B, the document cover 4 is supported by the housing 3A of the image reading portion 3 so as to be pivotable about an end portion of the upper surface 3A1 of the image reading portion 3 as a pivot center between the closed attitude and an open attitude. The end portion which is the pivot center is an end portion at the rear side (back surface side) in the front-rear direction 503. Thus, an end portion of the document cover 4 at the front side in the front-rear direction 503 is a pivot end. The closed attitude is an attitude in which the document cover 4 covers the upper surface 3A1 of the housing 3A of the image reading portion 3 (see FIG. 3A). The open attitude is an attitude in which the document cover 4 is apart from the upper surface 3A1 of the image reading portion 3 (see FIG. 3B).

The document cover 4 is an example of a cover portion of the present disclosure. The closed attitude corresponds to a first attitude of the present disclosure, and the open attitude corresponds to a second attitude of the present disclosure.

The lower surface of the document cover 4 is a cover surface 4B which is in contact with the upper surface 3A1 of the housing 3A of the image reading portion 3 when the document cover 4 is in the closed attitude.

The image forming apparatus 100 includes a conduction portion 70. The conduction portion 70 includes: a plurality of support portions 71 formed on the housing 3A (housing frame) of the image reading portion 3; and a pivot shaft 72 provided so as to extend in the housing 4A (housing frame) of the document cover 4. The pivot shaft 72 penetrates through the support portions 71. Thus, as described above, the housing 4A is pivotable about the pivot shaft 72 as a pivot center between the closed attitude and the open attitude.

Each of the support portions 71 and the pivot shaft 72 is formed from a material having electrical conductivity, such as metal. Thus, the support portions 71 and the pivot shaft 72 are electrically conducted to each other. Accordingly, the housing 3A of the image reading portion 3 and the housing 4A of the document cover 4 are electrically conducted to each other.

In this manner, the conduction portion 70 includes the pivot shaft 72 as a pivot center and electrically conducts the housing 3A of the image reading portion 3 and the housing 4A of the document cover 4 to each other.

The document cover 4 is apart from the document placement surface 10A2 when being in the open attitude, and is close to the document placement surface 10A2 when being in the closed attitude. In the closed attitude, the document cover 4 presses the document sheet placed on the document placement surface 10A2, such that the lower surface of the document sheet fits the document placement surface 10A2, and blocks external light traveling toward the reading unit 11.

The document cover 4 is provided with a cover open/close sensor (not shown) such as a limit switch. The cover open/close sensor outputs, to the control portion 9, a cover detection signal whose ON/OFF state is switched between when the document cover 4 is in the closed attitude and when the document cover 4 is in an attitude closer to the open attitude than to the closed attitude.

The result of detection by the cover open/close sensor is used as follows. For example, when the image reading start operation is performed, and then if the cover open/close sensor detects that the document cover 4 is in the open attitude, execution of the reading operation by the image reading portion 3 is temporarily suspended, and the temporary suspension is notified.

Thereafter, when the cover open/close sensor detects that the document cover 4 is in the closed attitude, the reading operation by the image reading portion 3 is executed.

Even while the cover open/close sensor does not detect that the document cover 4 is in the closed attitude, when the image reading start operation is performed again, the reading operation by the image reading portion 3 is executed.

The document cover 4 includes an ADF 18. The ADF 18 sequentially conveys document sheets, one by one, which are set in a document set portion 19, by means of a plurality of conveying rollers. Accordingly, each document sheet passes through a predetermined document reading position on the upper surface 3A1 in the right-left direction 502. When each document sheet is moved by the ADF 18, an image of the document sheet is read when the reading unit 11 stops at a position below the document reading position.

Figure 2:
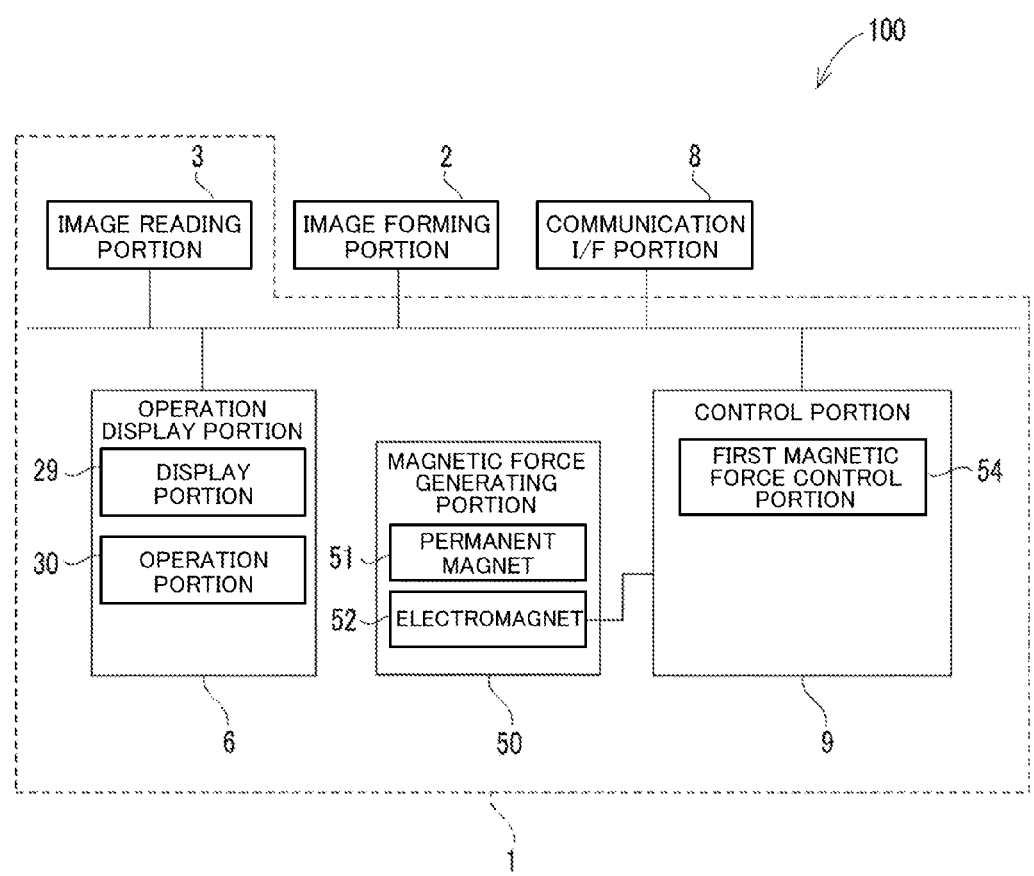
FIG. 2 is a block diagram showing the configuration of the image forming apparatus including the image reading device according to the first embodiment of the present disclosure.

The image forming portion 2 executes an image forming process (printing process) on a recording sheet by electrophotography on the basis of the image information read by the image reading portion 3 or an image formation job which is inputted from an external information processing apparatus such as a personal computer through a later-described communication I/F portion 8 (see FIG. 2).

The image forming portion 2 includes sheet feed cassettes 7. In addition, the image forming portion 2 includes a photosensitive drum 20, a charging portion 21, a developing portion 22, a toner container 23, a transfer roller 24, an electricity removing portion 25, a fixing roller 26, and a pressure roller 27.

The image forming portion 2 performs the image forming process on the recording sheets supplied from the sheet feed cassette 7 in the following procedure.

When an image formation job including a printing instruction is inputted, the photosensitive drum 20 is uniformly charged at a predetermined potential by the charging portion 21. Next, on the basis of the image information included in the image formation job, the output intensity of light applied from a laser scanning unit (LSU) to the surface of the photosensitive drum 20 is controlled.

Accordingly, an electrostatic latent image is formed on the surface of the photosensitive drum 20. Then, the electrostatic latent image on the photosensitive drum 20 is developed (visualized) as a toner image by the developing portion 22. Toner (developer) is supplied from the toner container 23 to the developing portion 22.

Subsequently, the toner image formed on the photosensitive drum 20 is transferred onto the recording sheet by the transfer roller 24. Thereafter, the toner image transferred onto the recording sheet is heated by the fixing roller 26 to be melted and fixed on the recording sheet, when the recording sheet passes through between the fixing roller 26 and the pressure roller 27 and is discharged. The potential of the photosensitive drum 20 is removed by the electricity removing portion 25.

The image forming apparatus 100 includes the communication I/F portion 8. The communication I/F portion 8 is an interface that executes data communication with an external apparatus which is connected to the image forming apparatus 100 via a communication network such as the Internet or a LAN.

The image reading device 1 includes the operation display portion 6 and the control portion 9. The operation display portion 6 includes a display portion 29, and an operation portion 30.

The display portion 29 includes, for example, a color liquid crystal display, etc., and displays various kinds of information to a user who operates the operation display portion 6. The operation portion 30 includes one or a plurality of various push button keys disposed adjacent to the display portion 29, a touch panel sensor disposed on a display screen of the display portion 29, and the like, and receives operations for inputting various kinds of instructions by the user of the image forming apparatus 100. When the operation display portion 6 receives, from the user, an operation for an instruction to execute one of various processes such as an image reading process, the operation display portion 6 outputs, to the control portion 9, an operation signal corresponding to the operation.

The control portion 9 includes a CPU, a ROM, and a RAM. The CPU is a processor which executes various calculation processes. The ROM is a non-volatile storage portion in which information such as a control program for causing the CPU to execute various processes is stored in advance. The RAM is a volatile storage portion which is used as a temporary storage memory (working area) for various processes executed by the CPU. The control portion 9 controls operation of the image forming apparatus 100 by the CPU executing the program stored in the ROM.

Figure 7:
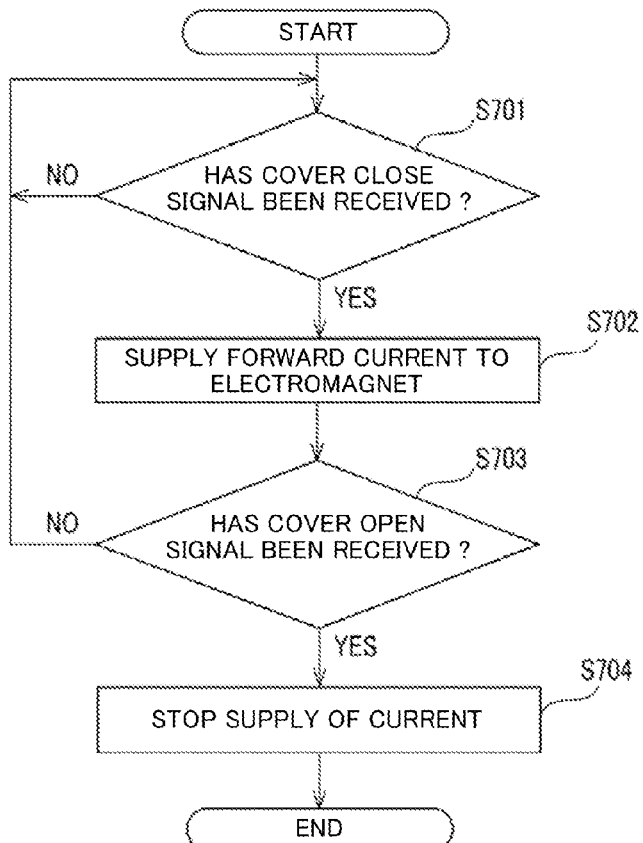
FIG. 7 is a flowchart showing a conduction process performed by a control portion.

In the ROM of the control portion 9, a processing program is stored which causes the CPU of the control portion 9 to execute a process described later (see a flowchart in FIG. 7). The processing program may be stored into the ROM at the time of shipment of the image forming apparatus 100. Alternatively, the processing program may be stored in a non-transitory computer-readable storage medium such as a CD, a DVD, or a flash memory, and may be stored from the storage medium into the ROM of the control portion 9 after the above shipment.

In the image forming apparatus 100, the housing 3A of the image reading portion 3 and the housing 4A of the document cover 4 are electrically conducted to each other at a position at the pivot shaft 72 side. However, if the housing 3A of the image reading portion 3 and the housing 4A of the document cover 4 are not electrically conducted to each other, the document cover 4 serves as an antenna at a position at the pivot shaft 72 side in the document cover 4, so that electromagnetic wave noise generated from a wire or the drive circuit which is included in the image reading portion 3 and outputs a signal to the imaging element 15 may be emitted from the pivot end of the document cover 4. Such emission of the electromagnetic wave noise may affect another electronic apparatus which is present around the image forming apparatus 100.

As a countermeasure against the above problem, there is a means for chassis-grounding the pivot end side of the document cover 4 to the image reading portion 3.

As such a chassis-grounding structure, for example, there is a structure in which a contact member which electrically conducts the housing 3A of the image reading portion 3 and the housing 4A of the document cover 4 to each other is mounted on at least one surface of a pair of surfaces of the image reading portion 3 and the document cover 4 that can face each other.

However, in this case, the contact member protrudes from the surface on which the contact member is mounted. Thus, there is a possibility that a certain object, a hand of the user, or the like is caught by the member. Or, there is a possibility that a document sheet that is about to be placed on the document placement surface 10A2 or taken out from the document placement surface 10A2 by the user is caught by the member. If such catching occurs, a great load may act on the member to break the member or break the document sheet.

In addition, the member can be an obstacle to an operation of placing a document sheet on the document placement surface 10A2 or taking out a document sheet from the document placement surface 10A2. Thus, the image reading device 1 has the following configuration.

The image reading device 1 includes a first conductive member 81 and a second conductive member 82.

The first conductive member 81 is provided in the image reading portion 3. The second conductive member 82 is provided in the document cover 4. As described later, when the document cover 4 is in the closed attitude, the first conductive member 81 and the second conductive member 82 electrically conduct the housing 3A of the image reading portion 3 and the housing 4A of the document cover 4 to each other.

The first conductive member 81 and the second conductive member 82 are provided such that the first conductive member 81 and the second conductive member 82 are opposed to each other in a state where the document cover 4 is in the closed attitude.

In a state where the document cover 4 is in the closed attitude, the first conductive member 81 and the second conductive member 82 are opposed to each other at a position which is a position at the pivot end side in the document cover 4 (at the front side in the front-rear direction 503) and is a position on a portion of the upper surface 3A1 of the image reading portion 3 other than the document placement surface 10A2.

Figure 5:
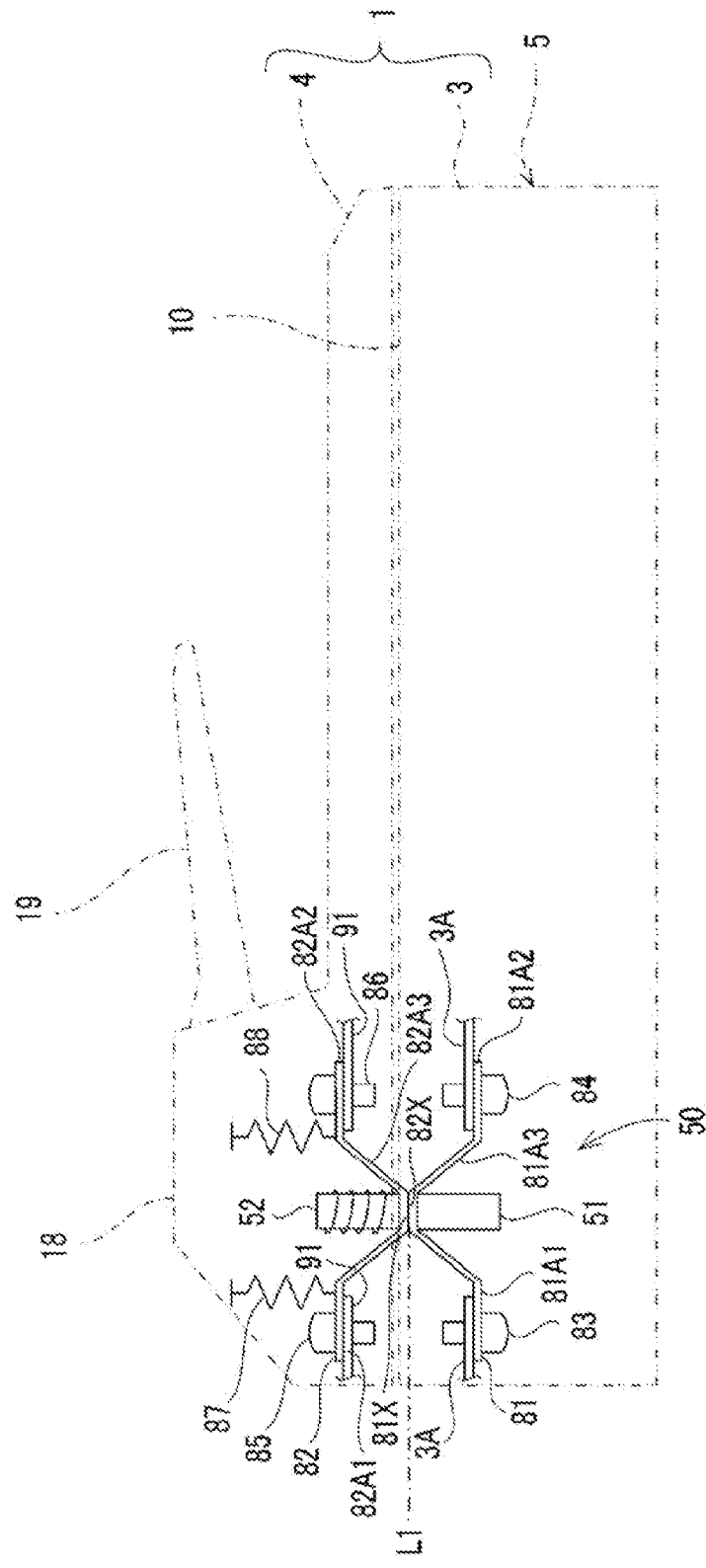
FIG. 5 is a diagram showing a state where an image reading portion and the document cover are conducted to each other by the first conductive member, the second conductive member, and the magnetic force generating portion.
Figure 6:
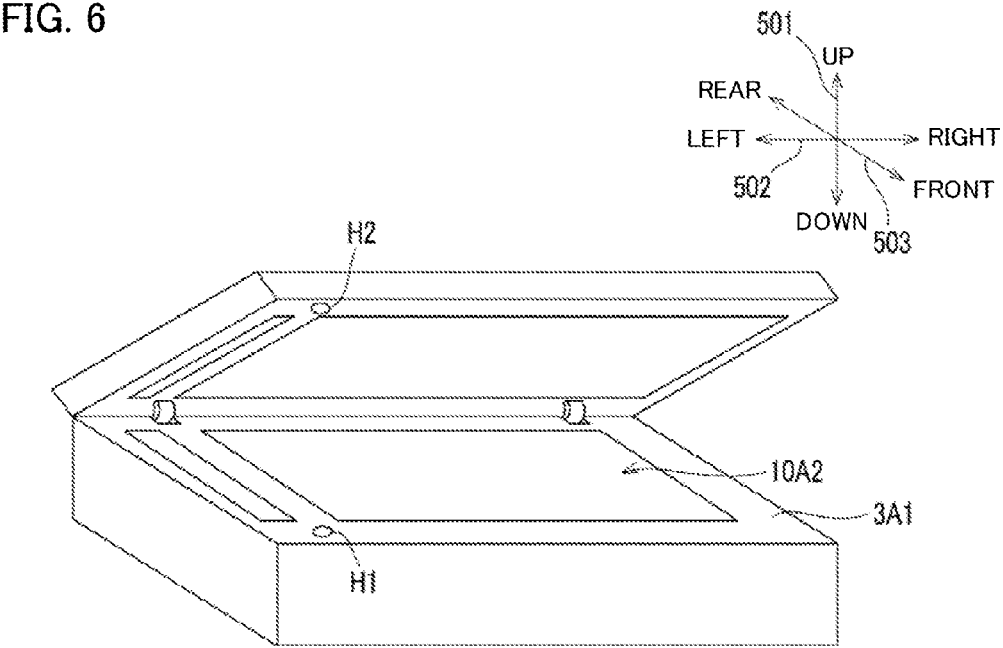
FIG. 6 is a perspective view representing an open attitude of the image reading device.

In the present embodiment, as shown in FIG. 5, the first conductive member 81 and the second conductive member 82 are opposed to each other at a position which is a position at the front side of the contact glass 10 in the front-rear direction 503 and is a position at the left side in the right-left direction 502.

The first conductive member 81 is formed from a material having electrical conductivity, such as metal. The first conductive member 81 is provided within the housing 3A of the image reading portion 3 and fixed to the housing frame of the image reading portion 3 by means of connection members 83 and 84 such as screws. Thus, the first conductive member 81 is electrically conducted to the housing frame of the image reading portion 3.

In the present embodiment, the first conductive member 81 is formed of a plate which has electrical conductivity and is bent by pressing, and includes a first flat plate portion 81A1, a second flat plate portion 81A2, and a projection portion 81A3 as shown in FIG. 4. The projection portion 81A3 is formed between the first flat plate portion 81A1 and the second flat plate portion 81A2.

The first conductive member 81 is mounted on the housing frame of the image reading portion 3 in such an attitude that the projection portion 81A3 projects upward from the first flat plate portion 81A1 and the second flat plate portion 81A2. In this attitude, the first conductive member 81 is fastened at the first flat plate portion 81A1 and the second flat plate portion 81A2 to the housing frame of the image reading portion 3 by means of the connection members 83 and 84 such as screws. The projection portion 81A3 includes a top portion 81X having a certain planar region. The top portion 81X of the projection portion 81A3 is located closer to an upper surface 10A of the image reading portion 3 than the first flat plate portion 81A1 and the second flat plate portion 81A2.

A hole H1 is provided in the upper surface 3A1 of the image reading portion 3 and at a position at which the first conductive member 81 is provided. The top portion 81X of the projection portion 81A3 faces the document cover 4 through the hole H1 when the document cover 4 is in the closed attitude.

Similarly to the first conductive member 81, the second conductive member 82 is formed from a material having electrical conductivity, such as metal. The second conductive member 82 is provided within the housing 4A of the document cover 4. The second conductive member 82 is provided within the housing 4A so as to be displaceable between a later-described held position within the housing 4A and a projection position at which the second conductive member 82 projects from the cover surface 4B.

A slide member 91 is provided in the housing 4A of the document cover 4 so as to be slidable on the housing frame. The slide member 91 is formed from a material having electrical conductivity, such as metal, and is slidable in a normal direction of the cover surface 4B. The second conductive member 82 is mounted on the slide member 91 by means of connection members 85 and 86 such as screws. Accordingly, the second conductive member 82 is electrically conducted to the housing frame of the document cover 4.

The slide member 91 is slidable in the normal direction of the cover surface 4B as described above. Since the second conductive member 82 is mounted on the slide member 91, the second conductive member 82 can be close to and apart from the image reading portion 3 when the document cover 4 is in the closed attitude.

In the present embodiment, similarly to the first conductive member 81, the second conductive member 82 is formed of a plate which has electrical conductivity and is bent by pressing, and includes a first flat plate portion 82A1, a second flat plate portion 82A2, and a recess portion 82A3. The recess portion 82A3 is formed between the first flat plate portion 82A1 and the second flat plate portion 82A2.

The second conductive member 82 is mounted on the housing frame of the image reading portion 3 in such an attitude that the recess portion 82A3 projects downward from the first flat plate portion 82A1 and the second flat plate portion 82A2. In this attitude, the second conductive member 82 is fastened at the first flat plate portion 81A1 and the second flat plate portion 81A2 to the housing frame of the document cover 4 by means of the connection members 85 and 86 such as screws. The recess portion 82A3 includes a bottom portion 82X having a certain planar region. The bottom portion 82X of the recess portion 82A3 is located at a position closer to the cover surface 4B of the document cover 4 than the first flat plate portion 82A1 and the second flat plate portion 82A2.

A hole H2 is provided in the cover surface 4B of the document cover 4 and at a position at which the second conductive member 82 is provided. The bottom portion 82X of the recess portion 82A3 faces the image reading portion 3 through the hole H2 when the document cover 4 is in the closed attitude.

Holding portions 87 and 88 elastically hold the second conductive member 82 at a predetermined held position in a state where the second conductive member 82 is stored within the housing 4A of the document cover 4, when a magnetic force generating portion 50 described later does not generate a magnetic force. When the second conductive member 82 is held at the held position, the recess portion 82A3 of the second conductive member 82 does not project from the hole H2 and is retracted within the housing 4A of the document cover 4. That is, a state is obtained in which the second conductive member 82 is stored within the housing 4A of the document cover 4. The holding portions 87 and 88 may elastically hold the second conductive member 82 such that the bottom portion 82X of the second conductive member 82 is flush with the cover surface 4B. The held position corresponds to a stored position of the present disclosure.

In the present embodiment, the holding portions 87 and 88 are coil springs. One end of each of the holding portions 87 and 88 is mounted on the housing 4A of the document cover 4. In addition, the other end of the holding portion 87 is mounted on the first flat plate portion 82A1 of the second conductive member 82, and the other end of the holding portion 88 is mounted on the second flat plate portion 82A2 of the second conductive member 82.

In the case where each of the coil springs is formed from a material having electrical conductivity, such as metal, the second conductive member 82 is electrically conducted to the housing frame of the document cover 4 also by the coil springs.

The image reading device 1 includes the magnetic force generating portion 50. The magnetic force generating portion 50 includes a permanent magnet 51 and an electromagnet 52. In the image forming apparatus 100 according to the present embodiment, the permanent magnet 51 is embedded in the image reading portion 3, and the electromagnet 52 is embedded in the document cover 4. The permanent magnet 51 and the electromagnet 52 are provided at such positions that the permanent magnet 51 and the electromagnet 52 are opposed to each other when the document cover 4 is in the closed attitude.

The permanent magnet 51 is fixed to the image reading portion 3. The permanent magnet 51 is provided on the first conductive member 81 and at the side opposite to the document cover 4. Specifically, the permanent magnet 51 is provided in a state of being in close contact with a surface of the top portion 81X at the side opposite to the document cover 4.

The electromagnet 52 is provided in the document cover 4 so as to be displaceable. The electromagnet 52 is provided on the second conductive member 82 and at the side opposite to the image reading portion 3. Specifically, the electromagnet 52 is provided in a state of being in close contact with a surface of the bottom portion 82X at the side opposite to the image reading portion 3.

The magnetic force generating portion 50 selectively generates a magnetic attraction force and a magnetic repulsion force between the permanent magnet 51 and the electromagnet 52. The magnetic force generating portion 50 is an example of a drive portion of the present disclosure. The permanent magnet 51 and the electromagnet 52 correspond to a pair of opposing portions of a magnetic force generating portion of the present disclosure.

In the present embodiment, the electromagnet 52 is able to selectively generate a magnetic field attracting the permanent magnet 51 and a magnetic field repulsing the permanent magnet 51, in accordance with the direction of a supplied current. Thus, the attraction force and the repulsion force between the permanent magnet 51 and the electromagnet 52 can be selectively generated. When no current is supplied to the electromagnet 52, neither the attraction force nor the repulsion force is generated between the permanent magnet 51 and the electromagnet 52.

The magnetic force generating portion 50 generates a driving force which displaces the second conductive member 82. The magnetic force generating portion 50 can displace the second conductive member 82 with the driving force in a direction toward a reference position L1, which is the position of the cover surface 4B, and a direction which is opposite to the direction toward the reference position L1 and is a direction toward the held position by the holding portions 87 and 88. In a state where the document cover 4 is in the closed attitude, the reference position L1 can be said to be the position, in the up-down direction 501, of a contact surface at which the upper surface 3A1 of the housing 3A of the image reading portion 3 and the cover surface 4B of the document cover 4 are in contact with each other.

The control portion 9 switches the magnetic force generating portion 50 between a first state where the magnetic force generating portion 50 generates the attraction force and a second state where the magnetic force generating portion 50 generates the repulsion force, by changing the direction of the current supplied to the electromagnet 52 according to need. The control portion 9 may switch the magnetic force generating portion 50 to a state where the magnetic force generating portion 50 does not generate either attraction force or the repulsion force. In this case, the control portion 9 supplies no current to the electromagnet 52.

In the following description, a current supplied to the electromagnet 52 when the magnetic force generating portion 50 is set in the first state is referred to as a forward current, and a current supplied to the electromagnet 52 when the magnetic force generating portion 50 is set in the second state is referred to as a reverse current.

The control portion 9 includes a first magnetic force control portion 54. In a state where the document cover 4 is in the closed attitude, the first magnetic force control portion 54 brings the magnetic force generating portion 50 into the state where the magnetic force generating portion 50 generates the attraction force. By so doing, the first magnetic force control portion 54 causes the magnetic force generating portion 50 to generate a biasing force (driving force) in a direction in which the second conductive member 82 is to be moved toward the reference position L1 against holding forces (elastic forces) generated by the holding portions 87 and 88, and apply the biasing force to the second conductive member 82.

Accordingly, in the present embodiment, the second conductive member 82 projects from the hole H2 across the reference position L1 to the outside to come into close contact with the first conductive member 81 within the housing 3A through the hole H1 of the image reading portion 3. The position of the second conductive member 82 when the second conductive member 82 is in close contact with the first conductive member 81 is referred to as a projection position.

The first magnetic force control portion 54 biases the second conductive member 82 in the direction toward the reference position L1, at which the upper surface 3A1 and the cover surface 4B are in contact with each other when the document cover 4 is in the closed attitude, by continuously supplying the forward current to the magnetic force generating portion 50. The first magnetic force control portion 54 is an example of a first drive control portion. In this manner, the second conductive member 82 is displaceable between the held position and the projection position.

Next, a conduction process performed by the control portion 9 will be described with reference to FIG. 7. In the flowchart in FIG. 7, S701, S702 . . . represent process procedure (step) numbers.

<Step S701>

In step S701, the control portion 9 determines whether a detection signal (cover close signal) indicating that the document cover 4 is brought into the closed attitude has been received from the cover open/close sensor (not shown). If the control portion 9 determines that the cover close signal has not been received (NO in step S701), the control portion 9 performs the process in step S701 again. On the other hand, if the control portion 9 determines that the cover close signal has been received (YES in step S701), the control portion 9 proceeds to a process in step S702.

<Step S702>

In step S702, the first magnetic force control portion 54 causes the magnetic force generating portion 50 to generate the attraction force, by supplying the forward current to the electromagnet 52. Thus, the electromagnet 52 is displaced toward the image reading portion 3 side against the holding forces (elastic forces) generated by the holding portions 87 and 88. Along with the displacement of the electromagnet 52, the second conductive member 82 projects from the hole H2, so that the bottom portion 82X of the second conductive member 82 enters the hole H1 of the image reading portion 3 in which the first conductive member 81 is present. Furthermore, as shown in FIG. 5, the bottom portion 82X of the second conductive member 82 comes into close contact with the top portion 81X of the first conductive member 81.

Accordingly, the first conductive member 81 and the second conductive member 82 are electrically conducted to each other. As a result, the housing 3A of the image reading portion 3 and the housing 4A of the document cover 4 are electrically conducted to each other. In the present embodiment, the position at which the first conductive member 81 and the second conductive member 82 are in close contact with each other is the position of the top portion 81X of the first conductive member 81 which position is outside a housing 4A.

<Step S703>

In step S703, the control portion 9 determines whether a detection signal (cover open signal) indicating that the document cover 4 is brought into the open attitude has been received from the cover open/close sensor (not shown). If the control portion 9 determines that the cover open signal has not been received (NO in step S703), the control portion 9 performs the process in step S701 again. While the control portion 9 determines in step S701 that the cover close signal has been received, the first magnetic force control portion 54 biases the second conductive member 82 such that the second conductive member 82 is in close contact with the first conductive member 81, by continuously supplying the forward current to the electromagnet 52. The magnetic force generating portion 50 and the first magnetic force control portion 54 are an example of a biasing portion of the present disclosure. On the other hand, if the control portion 9 determines that the cover open signal has been received (YES in step S703), the control portion 9 proceeds to a process in step S704.

<Step S704>

In step S704, the first magnetic force control portion 54 stops the supply of the forward current to the electromagnet 52. That is, the control portion 9 switches the magnetic force generating portion 50 to the state where the magnetic force generating portion 50 does not generate either the attraction force or the repulsion force. Accordingly, a force in a direction in which the second conductive member 82 is to be returned to the held position is applied from the holding portions 87 and 88 to the second conductive member 82, so that the second conductive member 82 retracts into the housing 4A of the document cover 4 to the held position. In this manner, the holding portions 87 and 88 hold the second conductive member 82 when the document cover 4 is brought from the closed attitude to the open attitude.

As described above, in the present embodiment, the first conductive member 81 and the second conductive member 82 are contactable with each other at a position at the pivot end side in the document cover 4 (at the front side in the front-rear direction 503). Thus, the document cover 4 can be prevented from serving as an antenna such that electromagnetic wave noise generated from the wire or the drive circuit which is included in the image reading portion 3 and outputs a signal to the imaging element 15 is emitted from the pivot end of the document cover 4. As a result, an adverse effect of such emission of the electromagnetic wave noise on another electronic apparatus which is present around the image forming apparatus 100 can be prevented in advance.

When the document cover 4 is in the open attitude, the first conductive member 81 and the second conductive member 82 do not protrude from the upper surface 3A1 of the image reading portion 3 and the cover surface 4B of the document cover 4, respectively. Thus, there is no possibility that a hand of the user or the like is caught by each contact member. In addition, there is no possibility that a document sheet that is about to be placed on the document placement surface 10A2 or taken out from the document placement surface 10A2 by the user is caught by each contact member. As a result, it can be avoided that a great load acts on a portion at which the contact member is mounted, due to the above catching, to break the portion or break the document sheet.

The first conductive member 81 and the second conductive member 82 do not become obstacles to an operation of placing a document sheet on the document placement surface 10A2 or taking out a document sheet from the document placement surface 10A2.

Due to the above, while breakage of the image forming apparatus 100 and a decrease in the operability are prevented, the electromagnetic wave noise can be prevented from being emitted from the document cover 4.

Meanwhile, in the present embodiment, when the document cover 4 is in the closed attitude, the second conductive member 82 is pulled toward the image reading portion 3 by the attraction force acting between the permanent magnet 51 and the electromagnet 52. Since the second conductive member 82 is connected to the housing 4A of the document cover 4 via the slide member 91, when the second conductive member 82 is pulled toward the image reading portion 3, the document cover 4 is pulled toward the image reading portion 3.

Thus, even when the thickness of the document sheet is relatively large or the document sheet has a fold, the document sheet can be pressed against the document placement surface 10A2 by the weight of the document cover 4 and the attraction force generated by the magnetic force generating portion 50. Particularly when the document sheet has a fold, a portion of the document sheet is prevented from rising up from the document placement surface 10A2.

Furthermore, the user is saved the trouble of, during execution of image reading, continuously pressing the document cover 4 while paying attention to completion of the image reading, in order to obtain a clear read image.

Second Embodiment

In the above-described embodiment, the first conductive member 81 is fixed to the image reading portion 3, and the second conductive member 82 is provided so as to be displaceable in the document cover 4.

In contrast, in the present embodiment, the first conductive member 81 is provided so as to be displaceable in the image reading portion 3, and the second conductive member 82 is fixed to the document cover 4. In addition, the first conductive member 81 is provided such that the first conductive member 81 is displaceable in the image reading portion 3 while being elastically held by the holding portions 87 and 88 at a predetermined held position within the housing 3A of the image reading portion 3.

When the first conductive member 81 is held at the held position, the projection portion 81A3 of the first conductive member 81 does not project from the hole H1 and is retracted within the housing 3A of the image reading portion 3. That is, a state is obtained in which the first conductive member 81 is stored within the housing 3A of the image reading portion 3. The holding portions 87 and 88 may elastically hold the first conductive member 81 in a state where the top portion 81X of the first conductive member 81 is flush with the upper surface 3A1. Alternatively, the holding portions 87 and 88 may elastically hold the first conductive member 81 in a state where the entire first conductive member 81 is retracted within the housing 3A. The held position corresponds to the stored position of the present disclosure.

The magnetic force generating portion 50 generates a driving force which displaces the first conductive member 81. The magnetic force generating portion 50 can displace the first conductive member 81 with the driving force in a direction toward the reference position L1, which is the position of the upper surface 3A1, and a direction which is opposite to the direction toward the reference L1 and is a direction toward the held position by the holding portions 87 and 88.

In a state where the document cover 4 is in the closed attitude, the first magnetic force control portion 54 brings the magnetic force generating portion 50 into the state where the magnetic force generating portion 50 generates the attraction force. By so doing, the first magnetic force control portion 54 causes the magnetic force generating portion 50 to generate a biasing force (driving force) in a direction in which the first conductive member 81 is to be moved toward the reference position L1 against the holding forces generated by the holding portions 87 and 88, and apply the biasing force to the first conductive member 81.

Accordingly, the first conductive member 81 projects from the hole H1 across the reference position L1 to the outside to come into close contact with the second conductive member 82 through the hole H2 of the document cover 4. The position of the second conductive member 82 when the second conductive member 82 is in close contact with the first conductive member 81 is referred to as a projection position.

The first magnetic force control portion 54 biases the first conductive member 81 in the direction toward the reference position L1, at which the upper surface 3A1 and the cover surface 4B are in contact with each other when the document cover 4 is in the closed attitude, by continuously supplying the forward current to the magnetic force generating portion 50. The first magnetic force control portion 54 is an example of the first drive control portion. In this manner, the first conductive member 81 is displaceable between the held position and the projection position. In addition, in a state where the first conductive member 81 is located at the projection position, when the first magnetic force control portion 54 stops the supply of the forward current to the electromagnet 52, a force in a direction in which the second conductive member 82 is to be returned to the held position is applied from the holding portions 87 and 88 to the second conductive member 82. Accordingly, the second conductive member 82 retracts into the housing 4A of the document cover 4 to the held position. In this manner, the holding portions 87 and 88 hold the second conductive member 82 when the document cover 4 is brought from the closed attitude to the open attitude.

Also in the present embodiment, the same advantageous effects as in the above-described first embodiment are obtained. In the present embodiment, the position at which the first conductive member 81 and the second conductive member 82 are in close contact with each other is the position of the bottom portion 82X of the second conductive member 82.

In the first embodiment and the second embodiment, the conductive member provided in one of the image reading portion 3 and the document cover 4 projects and enters the housing of the other of the image reading portion 3 and the document cover 4 to come into contact with the other conductive member. However, a configuration can be also adopted in which the first conductive member 81 and the second conductive member 82 contact each other on the contact surface at which the image reading portion 3 and the document cover 4 are in contact with each other.

That is, as a modification of the first embodiment, a mode can be also adopted in which the first conductive member 81 included in the image reading portion 3 is held by the holding portions 87 and 88 such that the upper surface of the top portion 81X of the first conductive member 81 is flush with the upper surface 3A1 of the image reading portion 3, and the second conductive member 82 included in the document cover 4 is brought into contact with the first conductive member 81.

As a modification of the second embodiment, a mode can be also adopted in which the second conductive member 82 included in the document cover 4 is held by the holding portions 87 and 88 such that the lower surface of the bottom portion 82X of the second conductive member 82 is flush with the cover surface 4B of the document cover 4, and the first conductive member 81 included in the image reading portion 3 is brought into contact with the second conductive member 82.

The following mode can be further adopted. The first conductive member 81 included in the image reading portion 3 is held by the holding portions 87 and 88 such that the upper surface of the top portion 81X of the first conductive member 81 is flush with the upper surface 3A1 of the image reading portion 3. The second conductive member 82 included in the document cover 4 is held by the holding portions 87 and 88 such that the lower surface of the bottom portion 82X of the second conductive member 82 is flush with the cover surface 4B of the document cover 4. When the document cover 4 is brought into the closed attitude, the upper surface of the top portion 81X of the first conductive member 81 and the lower surface of the bottom portion 82X of the second conductive member 82 are brought into contact with each other.

Third Embodiment

In the first embodiment and the second embodiment, either one of the first conductive member 81 and the second conductive member 82 is fixed, and the other of the first conductive member 81 and the second conductive member 82 is displaceable.

In contrast, in the present embodiment, the electromagnet 52 is embedded in each of the document cover 4 and the image reading portion 3. In addition, the first conductive member 81 is displaceable in the image reading portion 3 while being held by the holding portions 87 and 88. Moreover, the second conductive member 82 is displaceable in the document cover 4 while being held by the holding portions 87 and 88.

In a state where the document cover 4 is in the closed attitude, the first magnetic force control portion 54 brings the magnetic force generating portion 50 into the state where the attraction force is generated between the two electromagnets 52, thereby causing the magnetic force generating portion 50 to generate the driving force which displaces the first conductive member 81 and the second conductive member 82 in a projecting direction against the holding forces generated by the holding portions 87 and 88.

Also in the present embodiment, the same advantageous effects as in the above-described first embodiment are obtained.

Fourth Embodiment

In the above-described first embodiment, when the document cover 4 is in the closed attitude, the magnetic force generating portion 50 is caused to generate the attraction force to bring the first conductive member 81 and the second conductive member 82 into close contact with each other. However, the electromagnetic wave noise is generated mainly when the imaging element 15 is driven, that is, during execution of the reading job.

Thus, in the present embodiment, only when a condition that a reading job of reading an image of the document sheet that is placed on the document placement surface 10A2 when the document cover 4 is in the open attitude is executed is met, the first magnetic force control portion 54 causes the magnetic force generating portion 50 to generate the attraction force to bring the first conductive member 81 and the second conductive member 82 into close contact with each other. The time when the reading job is being executed refers to at least a period from a time when light reception by the imaging element 15 is started to a time when the light reception is ended.

Fifth Embodiment

In the above-described first embodiment, the second conductive member 82 is displaced on the basis of the control of the magnetic force generating portion 50 by the first magnetic force control portion 54, so that the housing 3A of the image reading portion 3 and the housing 4A of the document cover 4 are electrically conducted to each other.

In contrast, in the present embodiment, the magnetic force generating portion 50 and the first magnetic force control portion 54 are not provided, and the second conductive member 82 is displaced on the basis of the weight balance of the second conductive member 82 and the like depending on the attitude of the document cover 4, so that the housing 3A of the image reading portion 3 and the housing 4A of the document cover 4 are electrically conducted to each other.

That is, when the document cover 4 is brought into the closed attitude, the second conductive member 82 is displaced toward the image reading portion 3 by gravity acting on the second conductive member 82 and the like, so that the first conductive member 81 and the second conductive member 82 are brought into close contact with each other. On the other hand, when the document cover 4 is brought into the open attitude, the second conductive member 82 retracts into the housing 4A of the document cover 4 by the gravity acting on the second conductive member 82 and the like.

Also in the present embodiment, occurrence of an adverse effect of the electromagnetic wave noise can be prevented.

Sixth Embodiment

An image forming apparatus 200 according to a sixth embodiment of the present disclosure includes the following components in addition to the components of the image forming apparatus 100 according to the first embodiment.

Figure 8:
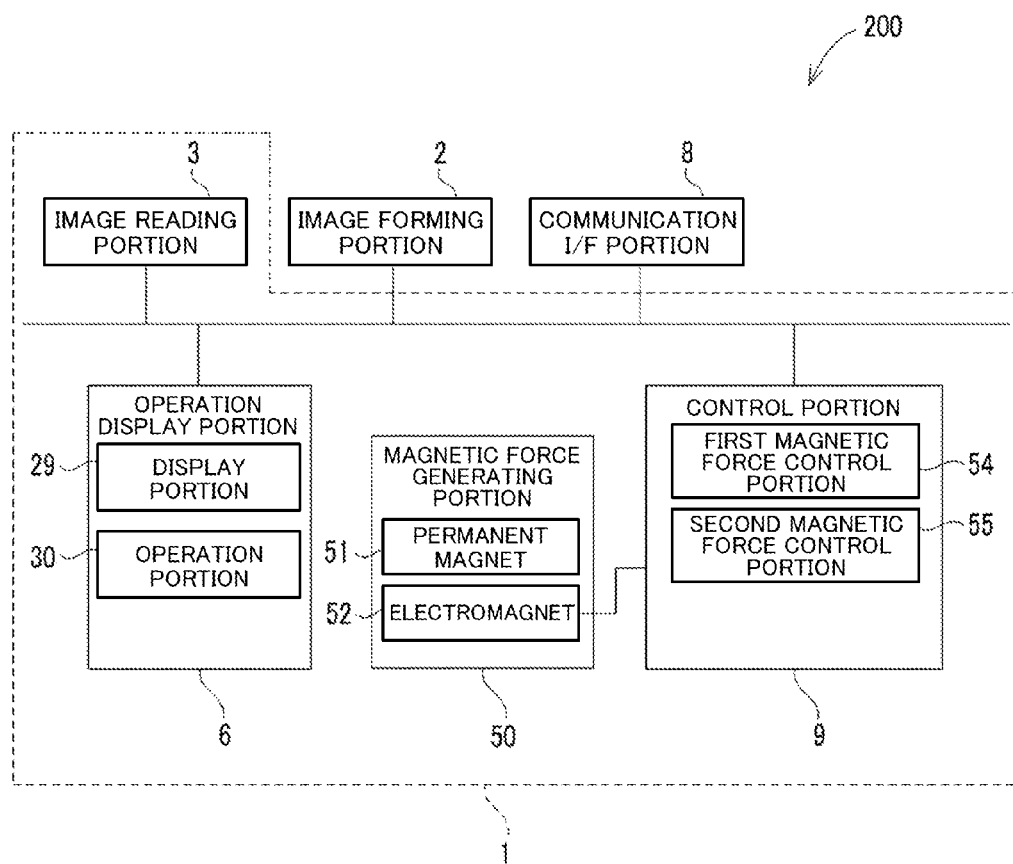
FIG. 8 is a block diagram showing the configuration of an image forming apparatus including an image reading device according to a sixth embodiment of the present disclosure.

As shown in FIG. 8, the control portion 9 includes a second magnetic force control portion 55 in addition to the first magnetic force control portion 54.

When the reading job ends, the second magnetic force control portion 55 causes the magnetic force generating portion 50 to generate the repulsion force, by supplying the reverse current to the electromagnet 52. Thus, the document cover 4 is moved away from the image reading portion 3. Here, in the present embodiment, the magnitude of the reverse current is such a current magnitude that a front portion of the document cover 4 rises up from the image reading portion 3 by a predetermined amount. The second magnetic force control portion 55 is an example of a second drive control portion.

A relatively large current may be supplied as the reverse current to the electromagnet 52 to cause the electromagnet 52 to generate a relatively great repulsion force, and the document cover 4 may be brought into the open attitude by the repulsion force. In this case, as compared to the case where the front side of the document cover 4 is raised up from the image reading portion 3 by a predetermined amount, an operation of pivoting the document cover 4, which has risen by a predetermined amount, to the open attitude does not need to be performed by the user, and convenience of the image forming apparatus 100 can be further enhanced.

Seventh Embodiment

An image forming apparatus 300 according to a seventh embodiment of the present disclosure includes the following components in addition to the components of the image forming apparatus 100 according to the first embodiment.

Figure 9:
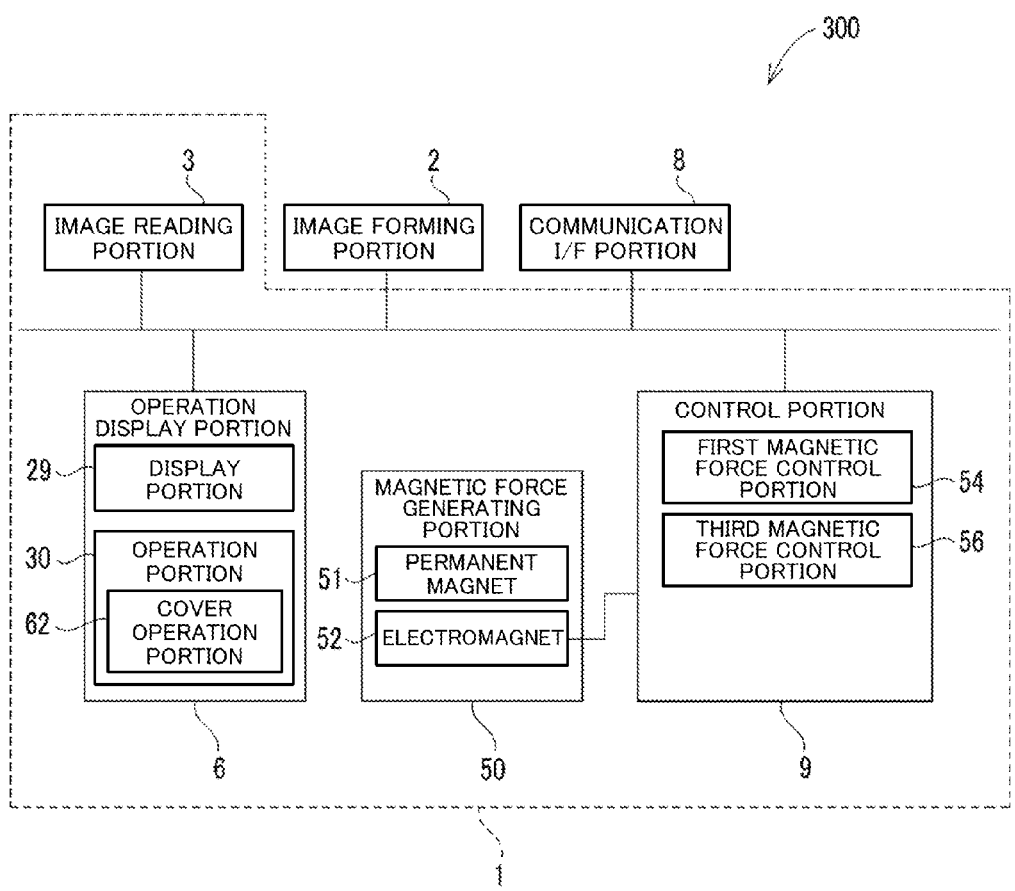
FIG. 9 is a block diagram showing the configuration of an image forming apparatus including an image reading device according to a seventh embodiment of the present disclosure.
Figure 10:
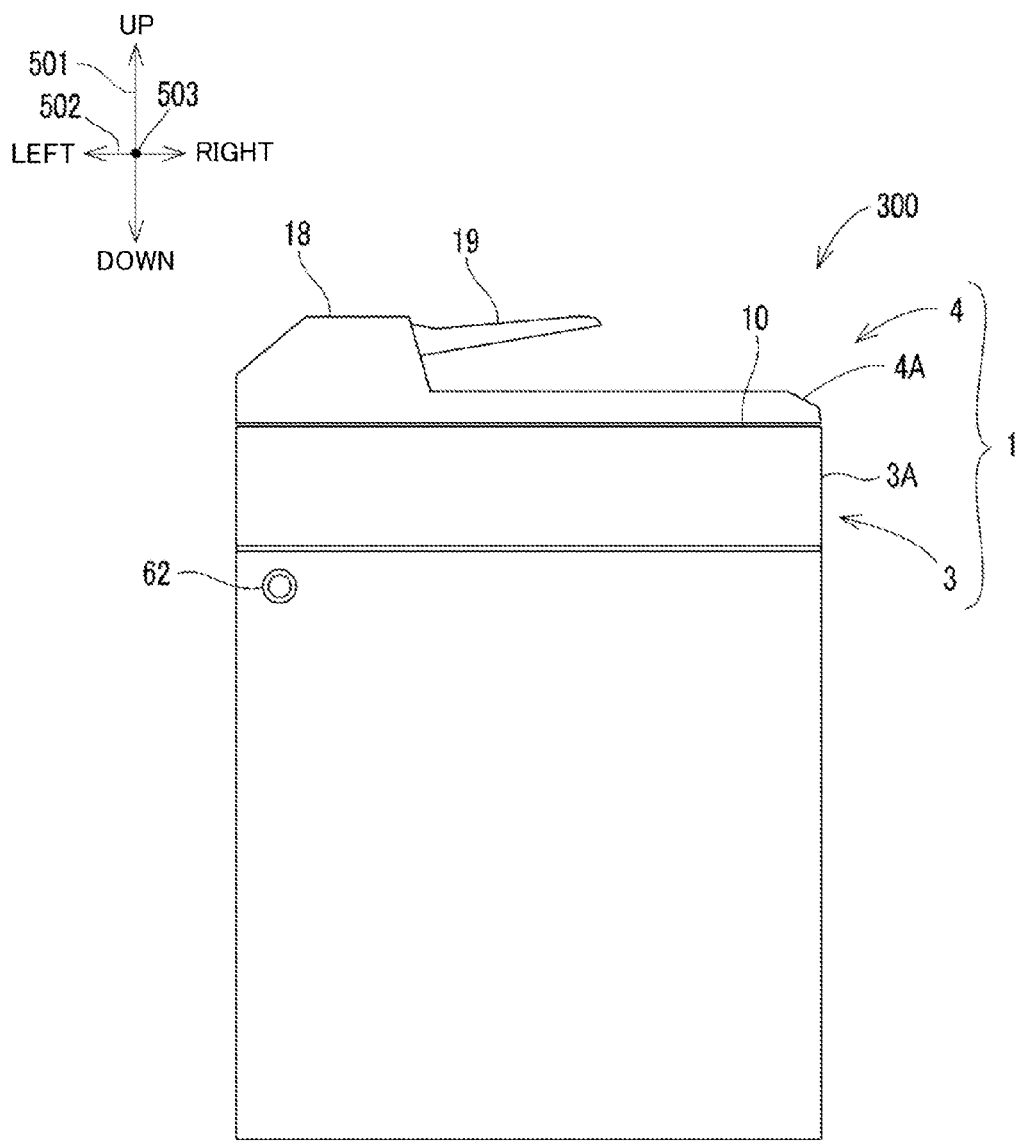
FIG. 10 is an external view of the image forming apparatus including the image reading device according to the seventh embodiment of the present disclosure.

As shown in FIGS. 9 and 10, the operation display portion 6 of the image forming apparatus 300 according to the present embodiment includes a cover operation portion 62 such as a push button. The cover operation portion 62 is operated by the user. As shown in FIG. 10, the cover operation portion 62 is provided, for example, at an appropriate position in a housing of the image forming portion 2. An operation on the cover operation portion 62 is an example of a predetermined user operation of the present disclosure.

The control portion 9 includes a third magnetic force control portion 56 in addition to the first magnetic force control portion 54. When an operation of pressing the cover operation portion 62 is performed, the third magnetic force control portion 56 causes the magnetic force generating portion 50 to generate the repulsion force. The third magnetic force control portion 56 maintains the state where the magnetic force generating portion 50 generates the repulsion force, for example, until the above-described end condition is met. Then, the third magnetic force control portion 56 stops the current supply to the magnetic force generating portion 50. The third magnetic force control portion 56 is an example of a third drive control portion.

With such a configuration, the user is allowed to bring the document cover 4 into the open attitude or the raised-up state, by the magnetic force generating portion 50, at a desired timing. The document cover 4 at the rising-up position from the document placement surface 10A2 can be lifted up to the open position with less power than the document cover 4 at the position in the closed attitude. As a result, operability and convenience of the image forming apparatus 300 can be enhanced.

A configuration in which the magnetic force generating portion 50 is caused to generate the repulsion force through an operation on the cover operation portion 62 may be provided instead of the configuration in which the magnetic force generating portion 50 is caused to generate the attraction force or the repulsion force in accordance with a state of the reading job.

Eighth Embodiment

In the above-described first embodiment, the permanent magnet 51 is fixed at a predetermined position in the image reading portion 3, and the electromagnet 52 is provided so as to be displaceable in the document cover 4.

In contrast, in an image forming apparatus 400 according to the present embodiment, the permanent magnet 51 is provided so as to be displaceable in the image reading portion 3, and the electromagnet 52 is fixed at a predetermined position in the document cover 4.

Figure 11:
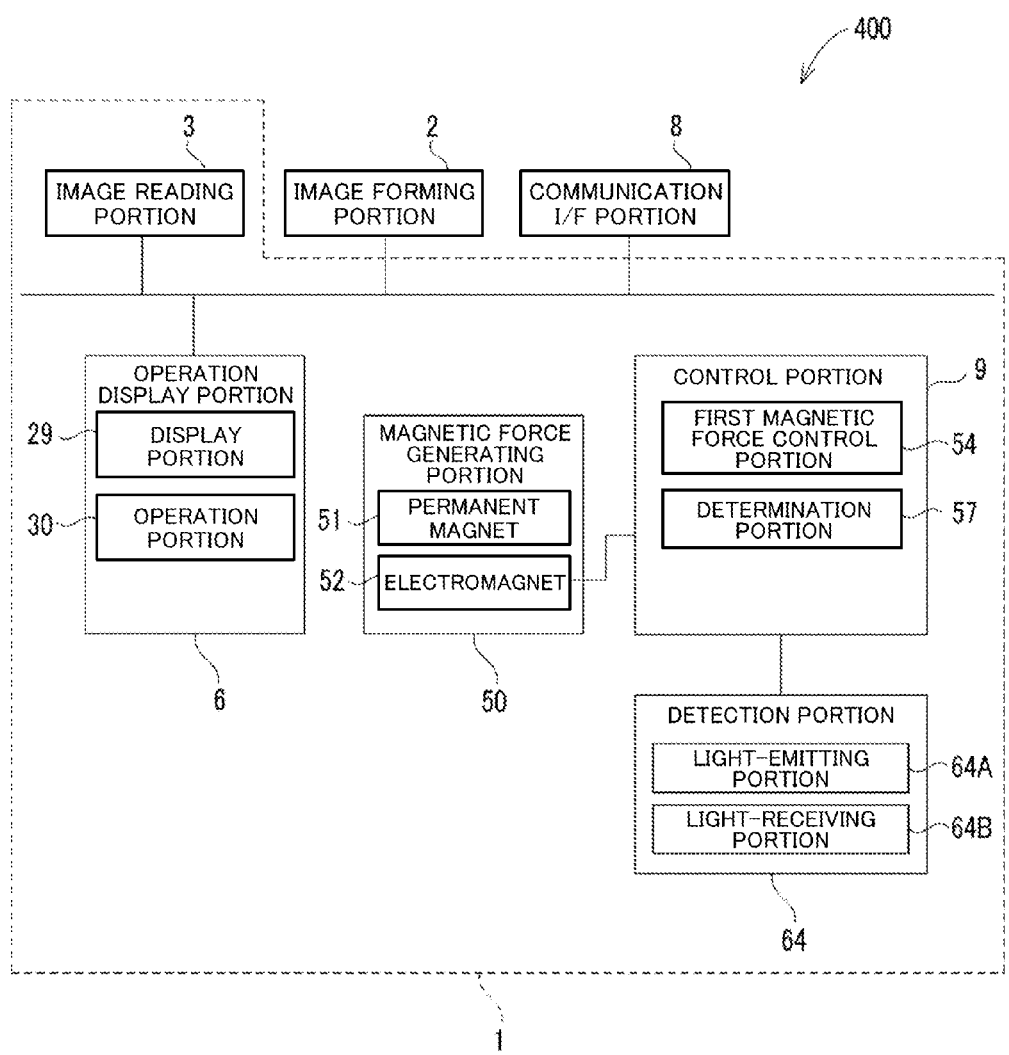
FIG. 11 is a block diagram showing the configuration of an image forming apparatus including an image reading device according to an eighth embodiment of the present disclosure.
Figure 12A:
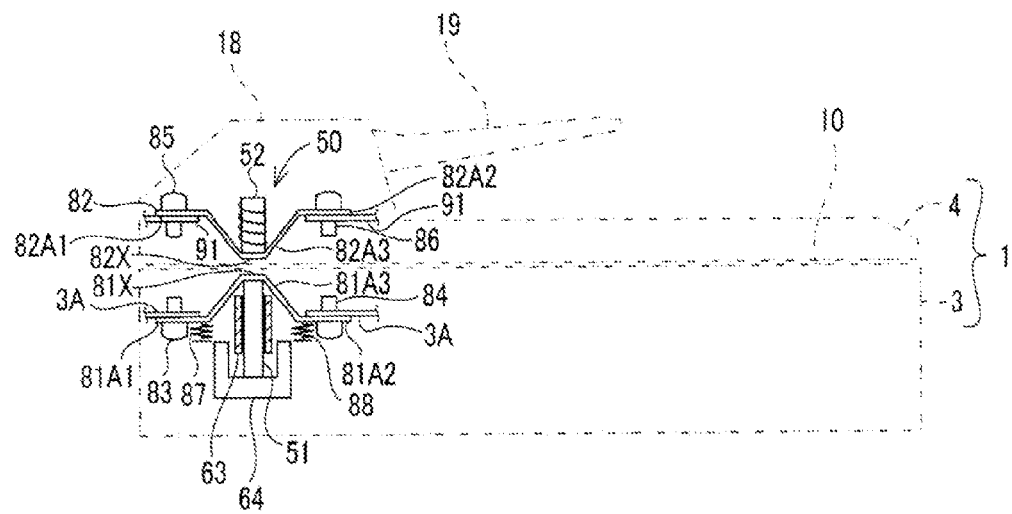
FIG. 12A is a diagram showing the magnetic force generating portion in a state where a permanent magnet is located at a first position.
Figure 12B:
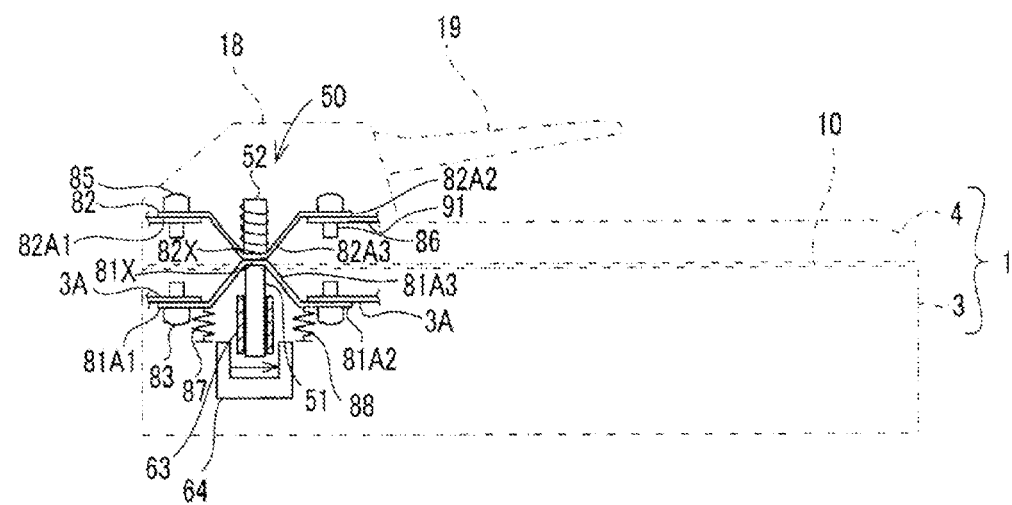
FIG. 12B is a diagram showing the magnetic force generating portion in a state where the permanent magnet is located at a second position.

As shown in FIGS. 11, 12A, and 12B, the image forming apparatus 400 according to the present embodiment is provided with a guide portion 63, a detection portion 64, and a determination portion 57.

The guide portion 63 is composed of, for example, a tubular member, and the permanent magnet 51 is movable within the guide portion 63. The guide portion 63 guides the permanent magnet 51 such that the permanent magnet 51 is displaceable between a first position opposing the electromagnet 52 and a second position lower than the first position by a predetermined amount, in a state where the document cover 4 is in the closed attitude. The first position is the position of the permanent magnet 51 when the first conductive member 81 is located at the projection position. The second position is the position of the permanent magnet 51 when the first conductive member 81 is located at the stored position.

Under a state where the document cover 4 is in the closed attitude, the permanent magnet 51 is located at the first position when the attraction force is generated between the permanent magnet 51 and the electromagnet 52, and otherwise, the permanent magnet 51 is located at the second position. Accordingly, the document cover 4 is pulled toward the image reading portion 3 by the attraction force generated by the magnetic force generating portion 50.

As shown in FIGS. 11, 12A, and 12B, in the present embodiment, the detection portion 64 detects a state where the permanent magnet 51 is located at the first position. In addition, in the present embodiment, the detection portion 64 is a photointerrupter. The detection portion 64 shown in FIGS. 11, 12A, and 12B is a transmission type photointerrupter. The photointerrupter includes a light-emitting portion 64A and a light-receiving portion 64B which are opposed to each other at a predetermined interval. The permanent magnet 51, when located at the second position, is located in a gap between the light-emitting portion 64A and the light-receiving portion 64B.

The signal level of a signal outputted from the light-receiving portion 64B is different between the case where light emitted from the light-emitting portion 64A is blocked by the permanent magnet 51 and the case where the permanent magnet 51 is not present in the gap and thus the light is received by the light-receiving portion 64B. In the present embodiment, when the light emitted from the light-emitting portion 64A is blocked by the permanent magnet 51, a LOW signal is outputted from the light-receiving portion 64B.

On the other hand, when the permanent magnet 51 is not present in the gap and thus the light is received by the light-receiving portion 64B, a HIGH signal is outputted from the light-receiving portion 64B. The signal outputted from the light-receiving portion 64B is outputted to the control portion 9 as an output signal from the detection portion 64.

When the forward current is supplied to the electromagnet 52 so that the magnetic force generating portion 50 generates the attraction force, the determination portion 57 determines whether the document cover 4 is in the open attitude or the closed attitude, on the basis of the result of the detection by the detection portion 64.

That is, when the HIGH signal is outputted from the detection portion 64 in the state where the magnetic force generating portion 50 generates the attraction force, the determination portion 57 determines that the document cover 4 is in the closed attitude. On the other hand, when the LOW signal is outputted from the detection portion 64 in the state where the magnetic force generating portion 50 generates the attraction force, the determination portion 57 determines that the document cover 4 is not in the closed attitude.

By adopting such a configuration, the cover open/close sensor is made unnecessary.

In the present embodiment, the detection portion is provided which detects that the permanent magnet 51 is at the first position. However, the present disclosure is not limited to this embodiment. That is, a configuration can be also adopted in which another detection portion which detects that the permanent magnet 51 is at the second position is further provided. Alternatively, a configuration can be also adopted in which either one of the detection portion which detects that the permanent magnet 51 is at the first position and the detection portion which detects that the permanent magnet 51 is at the second position is provided.

In the present embodiment, when the reading job ends, the control portion 9 causes the magnetic force generating portion 50 to generate the repulsion force, thereby moving the document cover 4 away from the image reading portion 3 to cause the document cover 4 to rise up from the image reading portion 3 by a predetermined amount.

Accordingly, it is made easy for a powerless user to perform an operation of opening/closing the heavy document cover 4 as in the image forming apparatus 100 of a type in which the document cover 4 is equipped with the ADF 18 as described in the present embodiment, or as in an image forming apparatus of a type supporting a large-size document sheet.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
    an image reading portion including a first housing having electrical conductivity and including, in an upper surface, a document placement surface on which a document sheet is placed, the image reading portion being configured to read an image of the document sheet placed on the document placement surface;
    a cover portion including a second housing supported by the first housing so as to be pivotable about an end portion of the upper surface of the first housing as a pivot center between a first attitude in which the second housing covers the upper surface and a second attitude in which the second housing is apart from the upper surface, the cover portion including a cover surface contactable with the upper surface in the first attitude;
    a conduction portion configured to electrically conduct the first housing and the second housing to each other at a predetermined position at the pivot center side in the cover portion;
    a first conductive member and a second conductive member provided so as to be opposed to each other at a predetermined position at a pivot end side in the cover portion in a state where the cover portion is in the first attitude, the first conductive member being provided in the image reading portion and electrically conducted to the first housing, the second conductive member being provided in the cover portion and electrically conducted to the second housing;
    a biasing portion configured to bias either one or both of the first conductive member and the second conductive member in a direction toward a predetermined reference position at which the upper surface and the cover surface are in contact with each other when the cover portion is in the first attitude; and
    a holding portion configured to hold either one or both of the first conductive member and the second conductive member such that the either one or both of the first conductive member and the second conductive member are stored within either one or both of the first housing and the second housing, when the cover portion is brought from the first attitude to the second attitude, wherein
    the second conductive member is provided in the second housing so as to be displaceable between a stored position at which the second conductive member is stored within the second housing and a projection position at which the second conductive member projects from the cover surface,
    the biasing portion applies a biasing force in a direction in which the second conductive member is to be moved toward the reference position, to the second conductive member to displace the second conductive member to bring the second conductive member and the first conductive member into contact with each other, and
    when the cover portion is brought from the first attitude to the second attitude, the holding portion applies a force in a direction in which the second conductive member is to be returned to the stored position, to the second conductive member to hold the second conductive member at the stored position.

2. The image reading device according to claim 1, wherein
    the holding portion elastically holds the second conductive member at the stored position, and
    the biasing portion displaces the second conductive member to the projection position against an elastic force generated by the holding portion.

3. The image reading device according to claim 2, wherein the holding portion elastically holds the second conductive member in a state where an outer end portion of the second conductive member is flush with the cover surface or in a state where an entire portion of the second conductive member is retracted within the second housing.

4. The image reading device according to claim 1, wherein
    the first conductive member is provided in the first housing so as to be displaceable between a stored position at which the first conductive member is stored within the first housing and a projection position at which the first conductive member projects from the upper surface,
    the biasing portion applies a biasing force in a direction in which the first conductive member is to be moved toward the reference position, to the first conductive member to displace the first conductive member to the projection position to bring the first conductive member and the second conductive member into contact with each other, and
    when the cover portion is brought from the first attitude to the second attitude, the holding portion applies a force in a direction in which the first conductive member is to be returned to the stored position, to the first conductive member to hold the first conductive member at the stored position.

5. The image reading device according to claim 4, wherein
    the holding portion elastically holds the first conductive member at the stored position, and
    the biasing portion displaces the first conductive member to the projection position against an elastic force generated by the holding portion.

6. The image reading device according to claim 5, wherein the holding portion elastically holds the first conductive member in a state where an outer end portion of the first conductive member is flush with the upper surface or in a state where an entire portion of the first conductive member is retracted within the first housing.

7. The image reading device according to claim 1, wherein the biasing portion includes:
    a drive portion configured to generate a driving force which displaces either one of the first conductive member and the second conductive member, to displace either one of the first conductive member and the second conductive member with the driving force in a direction toward the reference position and a direction which is opposite to the direction toward the reference position and is a direction toward the held position by the holding portion; and a first drive control portion configured to cause the drive portion to generate the driving force which displaces either one of the first conductive member and the second conductive member in the direction toward the reference position, in a state where the cover portion is in the first attitude, to bring the first conductive member and the second conductive member into contact with each other.

8. The image reading device according to claim 7, wherein the drive portion is able to generate a magnetic attraction force and a magnetic repulsion force between a pair of opposing portions provided on the first conductive member and the second conductive member, respectively, and the first drive control portion brings the drive portion into a state where the drive portion generates the attraction force as the driving force, in a state where the cover portion is in the first attitude, thereby causing the drive portion to generate the driving force which displaces either one of the first conductive member and the second conductive member to the reference position.

9. The image reading device according to claim 8, wherein the first drive control portion causes the drive portion to generate the attraction force, when a reading job of reading the image of the document sheet placed on the document placement surface is being executed.

10. The image reading device according to claim 8, further comprising a second drive control portion configured to cause the drive portion to generate the repulsion force, when a reading job of reading the image of the document sheet placed on the document placement surface ends.

11. The image reading device according to claim 8, further comprising a third drive control portion configured to cause the drive portion to generate the repulsion force, when a predetermined user operation is performed.

12. The image reading device according to claim 8, wherein the pair of opposing portions are a permanent magnet and an electromagnet, respectively.

13. The image reading device according to claim 1, wherein the image reading portion includes an imaging element and a drive circuit configured to drive the imaging element.

14. An image forming apparatus comprising:
the image reading device according to claim 1; and
an image forming portion configured to form the image read by the image reading device.

15. An image reading device comprising:
an image reading portion including a first housing having electrical conductivity and including, in an upper surface, a document placement surface on which a document sheet is placed, the image reading portion being configured to read an image of the document sheet placed on the document placement surface;

a cover portion including a second housing supported by the first housing so as to be pivotable about an end portion of the upper surface of the first housing as a pivot center between a first attitude in which the second housing covers the upper surface and a second attitude in which the second housing is apart from the upper surface, the cover portion including a cover surface contactable with the upper surface in the first attitude;

a conduction portion configured to electrically conduct the first housing and the second housing to each other at a predetermined position at the pivot center side in the cover portion;

a first conductive member and a second conductive member provided so as to be opposed to each other at a predetermined position at a pivot end side in the cover portion in a state where the cover portion is in the first attitude, the first conductive member being provided in the image reading portion and electrically conducted to the first housing, the second conductive member being provided in the cover portion and electrically conducted to the second housing;

a biasing portion configured to bias either one or both of the first conductive member and the second conductive member in a direction toward a predetermined reference position at which the upper surface and the cover surface are in contact with each other when the cover portion is in the first attitude; and a holding portion configured to hold either one or both of the first conductive member and the second conductive member such that the either one or both of the first conductive member and the second conductive member are stored within either one or both of the first housing and the second housing, when the cover portion is brought from the first attitude to the second attitude, wherein the biasing portion includes:
a drive portion configured to generate a driving force which displaces either one of the first conductive member and the second conductive member, to displace either one of the first conductive member and the second conductive member with the driving force in a direction toward the reference position and a direction which is opposite to the direction toward the reference position and is a direction toward the held position by the holding portion; and a first drive control portion configured to cause the drive portion to generate the driving force which displaces either one of the first conductive member and the second conductive member in the direction toward the reference position, in a state where the cover portion is in the first attitude, to bring the first conductive member and the second conductive member into contact with each other, the drive portion is able to generate a magnetic attraction force and a magnetic repulsion force between a pair of opposing portions provided on the first conductive member and the second conductive member, respectively, and the pair of opposing portions are a permanent magnet and an electromagnet, respectively, the first drive control portion brings the drive portion into a state where the drive portion generates the attraction force as the driving force, in a state where the cover portion is in the first attitude, thereby causing the drive portion to generate the driving force which displaces either one of the first conductive member and the second conductive member to the reference position, the first conductive member is provided in the first housing so as to be displaceable between a stored position at which the first conductive member is stored within the first housing and a projection position at which the first conductive member projects from the upper surface, the permanent magnet is provided on the first conductive member, the electromagnet is provided on the second conductive member, and the image reading device further comprises:
- a guide portion configured to guide the permanent magnet such that the permanent magnet is displaceable between a first position opposing the electromagnet and at which the permanent magnet is located when the first conductive member is located at the projection position and a second position which is below the first position and at which the permanent magnet is located when the first conductive member is located at the stored position, in a state where the cover portion is in the first attitude;
- a detection portion configured to detect that the permanent magnet is located at at least one of the first position and the second position; and
- a determination portion configured to determine whether the cover portion is in the first attitude or the second attitude, on the basis of a result of detection by the detection portion when the drive portion is in a state where the drive portion generates the attraction force.

* * * * *